US005628489A

United States Patent [19]

Woodman

[11] Patent Number: 5,628,489

[45] Date of Patent: May 13, 1997

[54] UNIBODY MASTER-SLAVE DISCHARGE VALVE ASSEMBLY FOR $CO_2$ SYSTEMS

[76] Inventor: Stuart D. Woodman, 2 Major Button's Drive, Markham, Ontario, Canada, L3P 3G5

[21] Appl. No.: 489,665

[22] Filed: Jun. 12, 1995

[51] Int. Cl.[6] .......... F16K 31/12

[52] U.S. Cl. .......... 251/29; 251/43; 137/266

[58] Field of Search .......... 251/28, 29, 43; 137/266

[56] References Cited

U.S. PATENT DOCUMENTS

| | | | |
|---|---|---|---|
| 2,492,165 | 12/1949 | Mapes | 251/29 |
| 2,611,577 | 9/1952 | Grant, Jr. | 137/266 |
| 2,619,109 | 11/1952 | Garrett et al. | 251/28 |
| 2,661,017 | 12/1953 | Geiger | 251/29 |
| 2,758,811 | 8/1956 | Peterson | 251/29 |
| 3,860,073 | 1/1975 | Willms | 251/43 |
| 4,967,934 | 11/1990 | Andonian | 137/266 |

*Primary Examiner*—Edward K. Look
*Assistant Examiner*—Michael S. Lee
*Attorney, Agent, or Firm*—Ridout & Maybee

[57] ABSTRACT

A master/slave discharge valve assembly for pressurized fluid containment systems includes a primary valve chamber, for connection to a fluid pressure source, formed by an eccentrically disposed first longitudinal bore and a secondary valve chamber defined by a second bore generally parallel to that of the primary chamber, communicating at one end with the primary valve chamber and a the other end with a discharge port. A displaceable primary valve member is positioned within the primary valve chamber. A slave valve member and an actuating piston are to open the slave valve member and permit a holding portion of pressurized fluid to vent to the atmosphere, thereby permitting the pressurized fluid to open the first valve member and allow pressurized fluid out the discharge port. A master/slave valve assembly according to the invention is of lower cost to manufacture as well as simpler and sturdier in construction than known valves for carbon dioxide fire suppression systems.

8 Claims, 6 Drawing Sheets

UNIBODY MASTER-SLAVE DISCHARGE VALVE ASSEMBLY FOR $CO_2$ SYSTEMS

The present invention is directed to fluid control systems as applied primarily in multi-cylinder $CO_2$ type fire extinguisher systems, and more particularly to integral master/slave valve assemblies therefor.

BACKGROUND OF THE INVENTION

Fire control systems utilizing a pressurized fluid such as $CO_2$ which floods a delivery line, range in size from a single master cylinder to dual master cylinders controlling the discharge of a bank of slave cylinders. Master cylinders are generally actuated either manually, electrically, or pneumatically, or by a combination of methods. In single or dual master systems, it is known to effect actuation using slave backpressure actuators such as those produced by Ansul, and others. However, in these systems, the backpressure actuator is either replaced in order to allow the valve to be used for a master cylinder, or is added to all valve units thus increasing the overall cost and complexity of installation.

SUMMARY OF THE INVENTION

It is an object of the present invention to provide a master/slave discharge valve assembly for pressurized fluid containment systems utilizing, for instance, cylindered $CO_2$. The valve assembly combines the requirements of simplicity and robustness, reliability, and low cost, more effectively than such valves previously proposed for $CO_2$ fire suppression systems and which is readily, and economically, convertible for use as either as a master valve or slave valve. The present invention provides a simple master/slave valve assembly which can be produced from low cost, readily obtainable starting stock and formed using essentially only a standard lathe/drillpress setup, or CNC station.

Accordingly the present invention is accomplished by providing an elongate valve body having a first longitudinally extending bore defining a primary valve chamber adapted to be connected to a fluid pressure source, the bore being eccentrically disposed thereby providing a thickened wall portion on one side of the valve chamber, a discharge port which traverses the thickened wall portion and communicates with the primary valve chamber, the valve body having a second longitudinally extending bore defining a secondary valve chamber generally parallel to the primary chamber and communicating at one end with the primary valve chamber and at the other end with the discharge port. A primary valve member is displaceable within the primary valve chamber, from a closed position to an open position by way of fluid pressure acting on one side of the valve member, which has a pressure equalization opening admitting a holding portion of the pressurized fluid to the other side of the valve member for normally holding the valve in the closed position. A slave valve member is disposed within the secondary valve chamber, one side of the slave valve member contacting the holding portion and the other side communicating with the atmosphere. An actuating piston is disposed within the secondary valve chamber, and is displaceable from a resting position to an activating position therein, a first side of the piston communicating with the discharge port and a second side communicating with the atmosphere. A predetermined pressure in the discharge port displaces the actuating piston which inturn displaces the slave valve member to an open position and permits the holding portion of the pressurized fluid to vent to the atmosphere. This permits the pressurized fluid to displace the first valve member to the open position and permits the pressurized fluid egress through the discharge port.

In the slave mode of operation, the first valve member is provided with a return spring to urge the valve member into the closed position when charging of the cylinder has been completed.

The actuating piston of the slave valve assembly is provided with a circumferential groove in which an O-ring having an easy sliding fit within the secondary valve chamber is disposed, and the groove has radially directed openings which communicate with the discharge end of the actuating piston. Such arrangement provides for a gas tight seal and both positive engagement of the piston when actuated and positive resetting of the piston once the controlled cylinder has discharged.

DESCRIPTION OF THE DRAWINGS

A preferred embodiment of the invention will now be described by way of example with reference to the accompanying drawings in which.

DESCRIPTION OF THE PREFERRED EMBODIMENTS

Figure 1:
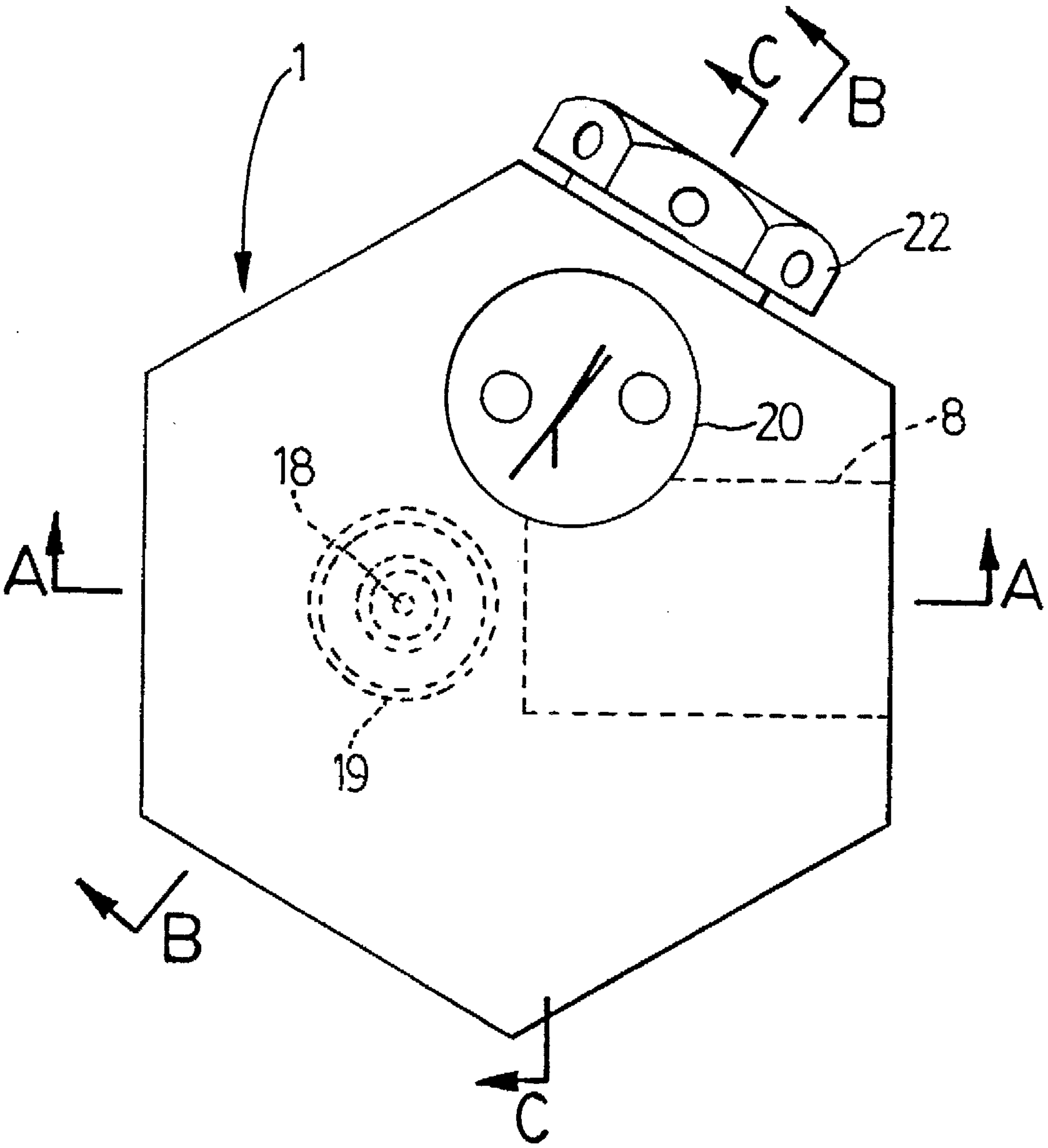
FIG. 1 is top view of a valve assembly body.

Referring to FIG. 1, shown from above is a hexagonal valve body 1, of an embodiment of the present invention. A slave valve housing 20 is disposed eccentrically to the axis of the valve body. Indicated by dashed lines are the relative positions of a discharge port 8, and a pilot valve 18 in a threaded opening 19. Also shown is a safety relief assembly 22, which is disposed at a vertical position generally indicated by reference numeral 23 (FIGS. 2 and 3), which intersects an input port 6 (FIG. 2, 3) and allows the emergency release of the pressurized fluid. While shown herein as being hexagonal, the body of the valve assembly can be formed from virtually any elongate piece of starting stock, ie. square, octagonal, etc. Both the preferred hexagonal shape and an octagonal shape have the advantage that they can be used directly with a wrench thereby saving labor during installation.

Figure 2:
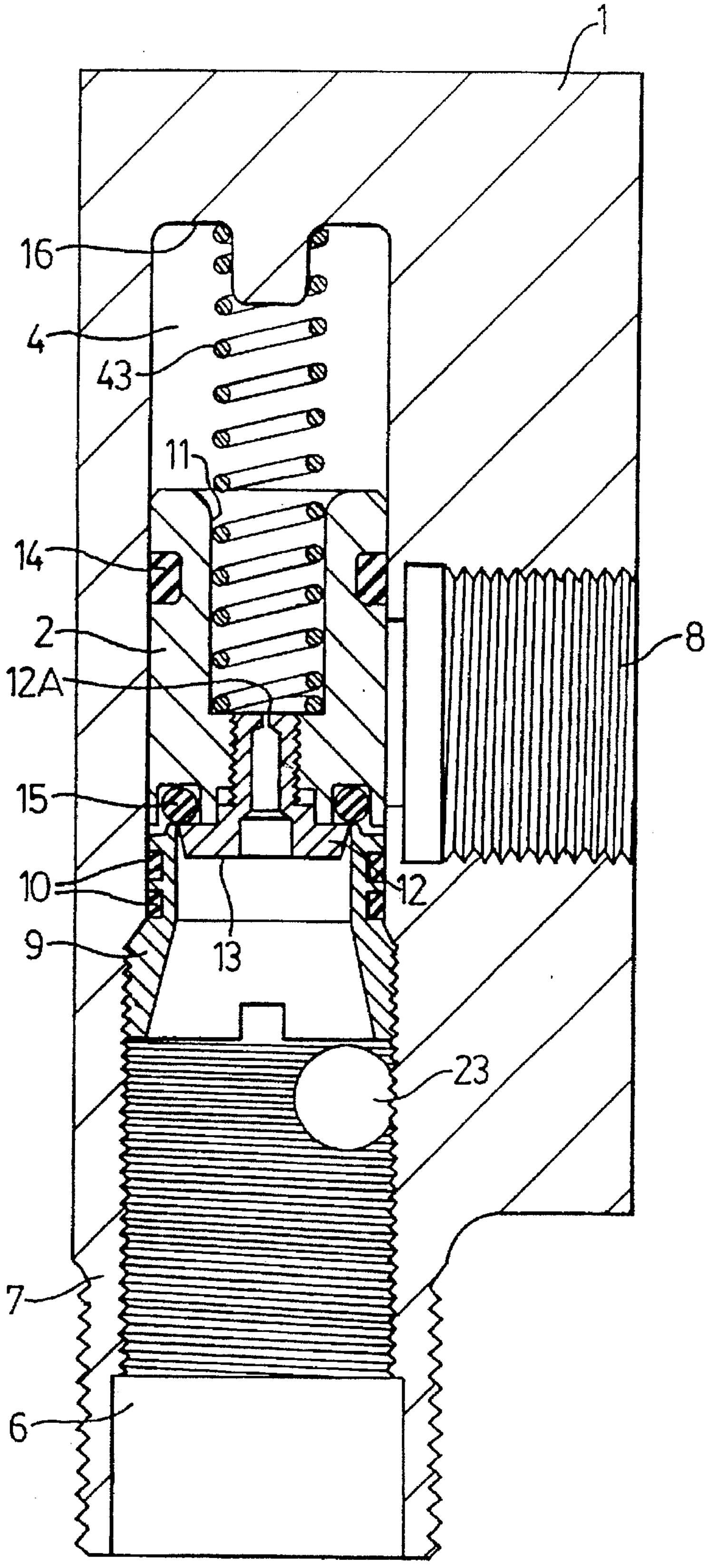
FIG. 2 is longitudinal cross-section of the slave valve embodiment taken along line A—A of FIG. 1.
Figure 3:
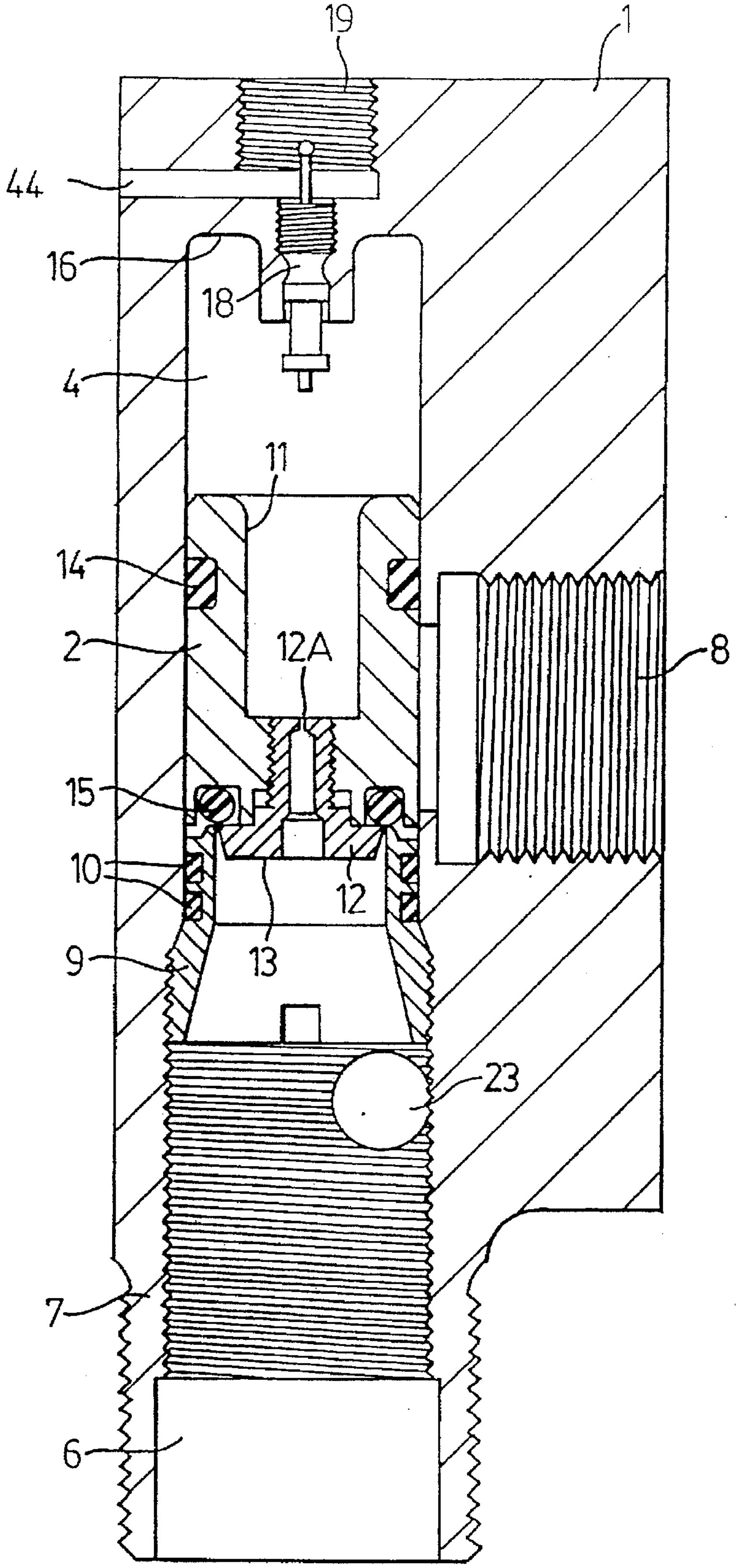
FIG. 3 is longitudinal cross-section of a master valve embodiment taken along line A—A of FIG. 1.

Turning now to FIGS. 2 and 3, the main valve body 1 of the preferred embodiment described herein comprises a hexagonal piece of stock metal such as brass, etc. Eccentrically disposed within the hexagonal main valve body 1 and extending therethrough but stopping short of the distal end is a first bore which provides both a main valve chamber 4 and the input port 6. The junction between the valve chamber 4 and the input port 6 is demarcated by a threaded portion into which is mounted a removable valve seat 9. A portion of the body exterior surrounding the input port 6 is machined down to produce mounting threads 7, the axis of which coincides with the axis of the main bore. The threads allow mounting of the valve body into the neck of a pressurized fluid cylinder. The input port 6 is internally threaded so as to provide means for mounting a dip tube (not shown).

The removable valve seat 9 is provided with sealing gaskets 10, and is mounted by means of threading and when situated, distal end of which defines to one side the main valve chamber 4 and to the other, the terminus of the input port 6. The valve seat 9 cooperates with an O-ring 15 of a piston 2 or first valve member in the closed position to prevent discharge of the pressurized fluid. Since the valve seat 9 when situated is readily accessible by means of the input port 6, it provides an economical and fast method of servicing both the valve or seat should any damage occur. This significantly reduces the cost of replacement valve assemblies both in terms of labor and materials.

The piston 2 is disposed within the main valve chamber 4 and is reciprocable between a first and second position therein. In the first or closed position as shown in FIGS. 2 and 3, the piston is disposed at a first end of the chamber 4 as defined by valve seat 9 and prevents the unthrottled discharge of a pressurized fluid passing from the pressurized fluid supply cylinder through the input port 6 to the discharge port 8 communicating with the chamber 4. The discharge port 8 will generally communicate with the main valve chamber at approximately 90°, such that the port opens onto the main valve chamber at a position between an O-ring 14 of piston 2 in the closed position, and O-rings 10 of the valve seat 9. Displacement of the main valve chamber and associate slave valve assembly eccentrically within the starting stock permits a smaller size of stock to be employed for the valve body. Such an arrangement provides sufficiently thickened cylindrical wall section into which the discharge port 8 can be machined and to which flexible connecting tubing 34 (FIG. 8) can be mounted. This arrangement also avoids excessive wall thickness at the opposite side of the valve body while leaving sufficient material to resist the high pressures normally involved. The flexible connecting tube 34 connects to a discharge manifold 33 and the tube 34 and manifold 33 together form a discharge manifold system 33/34.

In the first or closed position, the piston 2 is held in place against seat 9 by means of pressurized fluid operating on one side, or the back face 11 of the piston. For clarity this pressurized fluid will be termed holding force. The pressurized fluid for holding force is provided to the back face of the piston 2 by means of a pressure balancing port body 12 mounted into the piston body 2 and which allows fluid flow between the front face 13 and back face 11 of the piston 2 via pressure balancing port 12*a*. The area of the pressure balancing port opening is smaller than that of either of the valves 18, 28 described hereinafter. The O-ring 14 prevents gas escape from along the edge of piston 2 and mating chamber 4 wall to discharge port 8. The pressure balancing port body 12 also serves to hold the O-ring 15 in place yet allow ready replacement thereof when required. The central hole in face 13 of piston 2, which connects with pressure balancing port 12*a* can be provided with a threaded portion permiting the attachment of a tool for extracting the piston when required. The piston back face 11 of the piston 2 presents a surface area that is larger than the surface area presented by the front face 13 of the piston. This difference in size prevents movement of the piston until such time as the holding force exerted by the holding pressure on the piston back face 11 is reduced to below that of the force exerted by the pressurized fluid entering via input port 6 and acting on face 13. The back face 11 of the piston 2 is shaped so as to permit full travel of the piston 2 while providing clearance with the correspondingly shaped distal end wall 16 of the chamber 4. A return spring 43 is preferably disposed between the endwall 16 and the piston 2 backface 11 to urge the piston 2 into the closed position at such time as the cylinder has been recharged. At the end of charging, which is accomplished by means of port 8, port 8 is still fully pressurized. While charging, pressure balancing port 12*a* permits a flow of gas to the back face of piston 2, such that both sides of the valve will equilibriate. Accordingly, once equilibrium is reached, return spring 43 urges the piston 2 into the closed position.

FIG. 2 shows the valve assembly of the present invention configured for slave valve use on a slave cylinder. When it is desired to configure the valve assembly for use as a master valve on a master cylinder 102 (FIG. 8) as shown in FIG. 3, a Schraeder-type pilot valve 18 is removably disposed axially within the endwall 16. The pilot valve 18 is controlled directly by an external actuator 105 (FIG. 8) mounted by way of threaded opening 19 and providing master cylinder capability. The external actuator 105 can be electrically, pneumatically, or mechanically based, or may be of a combination thereof. When actuated by the actuator 105, the pilot valve 18 releases the holding force acting on the backface of piston 2 to atmosphere via vent opening 44, thus allowing a rapid release of the holding force. The discharge rate of the pilot valve 18 is greater than that of the balancing port 12*a* so that when open, the pilot valve 18 releases the holding force from behind piston 2 at a rate faster than that which the balancing port 12*a* is capable of renewing, thus ensuring a positive opening of the piston 2. At such time as the holding force operating on the back face 11 of the piston 2 is released, the piston 2 is displaced to the distal end of the chamber 4, thereby allowing the pressurized fluid egress by means of the discharge port 8. While the return spring 43 is preferably employed in the master valve embodiment to close the valve 2, an alternative approach is that the piston 2 can be returned to the closed position by means of gas pressure directed into the vent opening 44 while the Schraeder valve 18 is open. Piston 2 is preferably closed when not in use or when in transit so that foreign material can not enter the cylinder or contaminate the valve system.

Charging of the cylinder is effected by coupling the refilling line to the discharge port 8. When the refilling line is charged, the $CO_2$ flows between the piston 2 and chamber 4 wall and acts on the face of piston 2 in the region of O-ring 15, and causes the piston 2 to be moved into the open position thus allowing the $CO_2$ to flow into the cylinder. When the cylinder has been charged to the appropriate weight, the filling line valve is closed, leaving the filling line pressurized. As the front and back faces of piston 2 reach equilibrium by way of pressure balancing port 12A, spring 43 serves to urge piston 2 into the closed position. The filling line may then be vented and disconnected. Return spring 43 must apply sufficient force to more than overcome any friction effected by O-ring 14.

Figure 4:
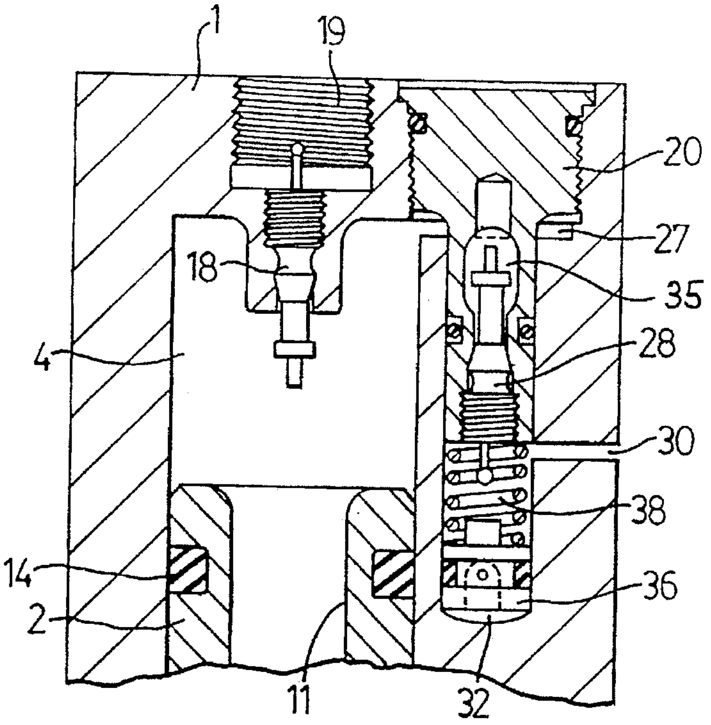
FIG. 4 is a portion of a longitudinal view of the valve assembly of FIG. 3 taken along line B—B of FIG. 1.
Figure 7:
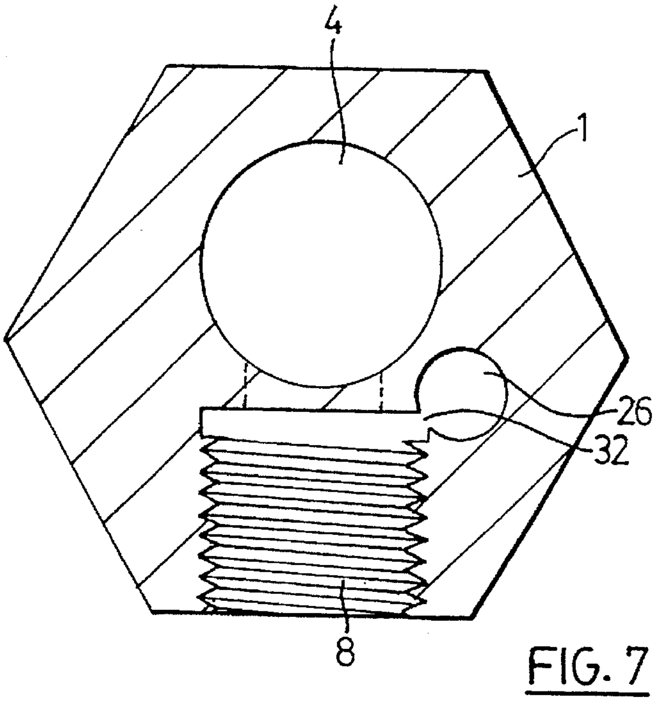
FIG. 7 is a cross-section taken along line D—D of FIG. 5.
Figure 5:
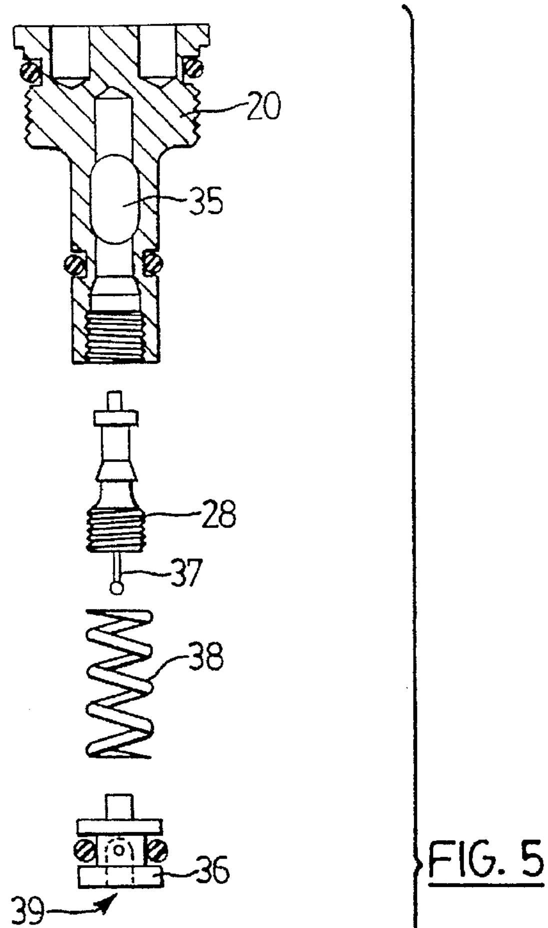
FIG. 5 is longitudinal cross-section taken along line C—C of FIG. 1 showing a sub-valve assembly in exploded format.
Figure 5:
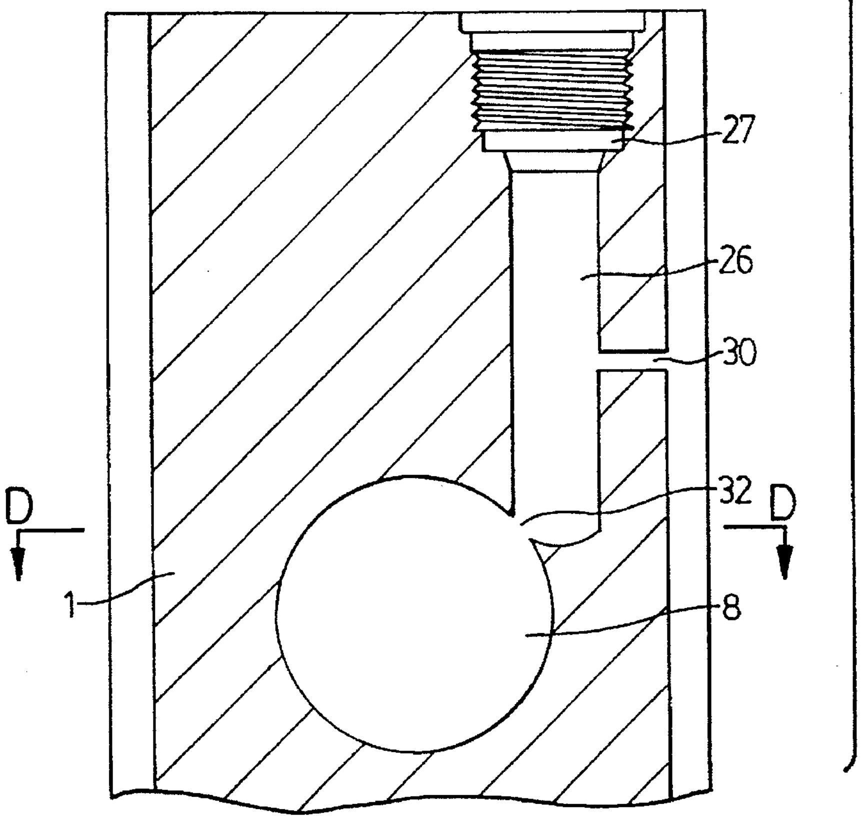

As shown in FIGS. 4 and 5 the slave valve housing 20 serves to provide one end of slave valve chamber 26 in which is disposed a slave valve 28, which is of the Schraeder-type. The top of the chamber 26 is provided with a shallow counterbore 27, the radius of which overlaps that of the main valve chamber 4 by a small amount so that communication along a small portion of the circumference of each chamber is enabled. This overlap permits holding force from the main valve chamber 4 to be present in the Schraeder chamber 35 by way of the counter bore 27, as the top of the Schraeder chamber 35 opening projects somewhat above the bottom of the counterbore 27. While in the closed position shown, slave valve 28 prevents the holding force of chamber 4 from discharging to atmosphere via atmospheric port 30. Once in the open position, the slave valve 28 permits discharge of the holding force through port 30 to atmosphere, thereby allowing piston 2 to be displaced distally by the pressurized fluid acting on face 13, allowing full and rapid discharge of the pressurized fluid through the now open discharge port 8. The flow rate of the slave valve 28, like that of pilot valve 18, is greater than that of the balancing port 12*a* so that a positive actuation occurs. The slave valve 28 is actuated by backpressure in the discharge manifold 33/34 system and the discharge port 8. This backpressure is present when any of the master cylinders on the manifold are actuated and release their contents. Via a slave actuator port 32 communicating with discharge port 8 (FIG. 7), the backpressure displaces actuating piston 36 axially in the slave valve chamber 26 and into contact with the slave valve release 37. When acted upon by piston 36, valve release 37 displaces opening the slave valve 28. A return spring 38, of light loading force, serves to ensure that until positively actuated, piston 36 will not engage valve release 37.

Due to the interaction between the main valve and slave valve of the valve assembly, triggering of the slave valve 28 also occurs when the master valve to which it is attached discharges, thereby preventing any holding force from accruing during discharge. This aspects provides a fail-safe discharge of the cylinder contents even in the event that the pilot valve 18 later fails and closes prior to a full discharge of cylinder contents.

Figure 6:
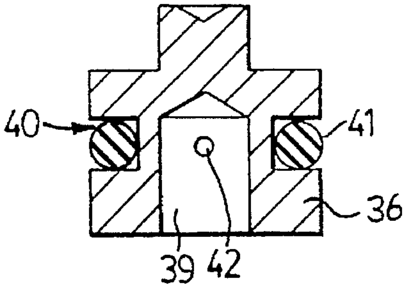
FIG. 6 illustrates a detail of the slave actuating piston shown in FIG. 5.

FIG. 6 is a cross-section detail of the slave valve actuating piston 36 showing a bore 39 disposed axially in the piston 36. A groove 40 around the circumference of the piston serves to hold an O-ring 41. The O-ring 41 is in minimal contact with the valve chamber 26 walls so as to permit easy movement of the piston 36 at low pressures. Communicating with the bore 39 and groove 40 are a plurality of radially disposed openings 42. At such time as a master cylinder discharges and backpressure builds up in the discharge port 8, piston 36 moves into contact with valve release 37. As the pressure continues to build below the actuating piston 36, it flows through the bore 39, and the openings 42 to the inside of the O-ring 41, causing the O-ring 41 to be urged outward against the chamber 26 walls and form a gas tight seal therewith. The actuating piston 36 engages the valve release 37 with sufficient force to displace it and fully open the slave valve 28. This allows the holding force on the backface 11 of piston 2 to be released to atmosphere with subsequent opening of the main discharge port 8. The gas tightness achieved by O-ring 41 further prevents backpressure from the discharge port 8 and distribution manifold system 33/34 from potentially interfering with, or overwhelming the release of the holding force. At such time as the backpressure at the discharge port 8 reduces to near atmospheric pressure, O-ring 41 will reseat itself in groove 40, and the piston 36 will, urged by the return spring 38, return to its starting position, thus allowing slave valve 28 to close. The slave valve 28 must close in order to allow the holding force to be built up behind piston 2, when the cylinder is recharged.

Figure 8:
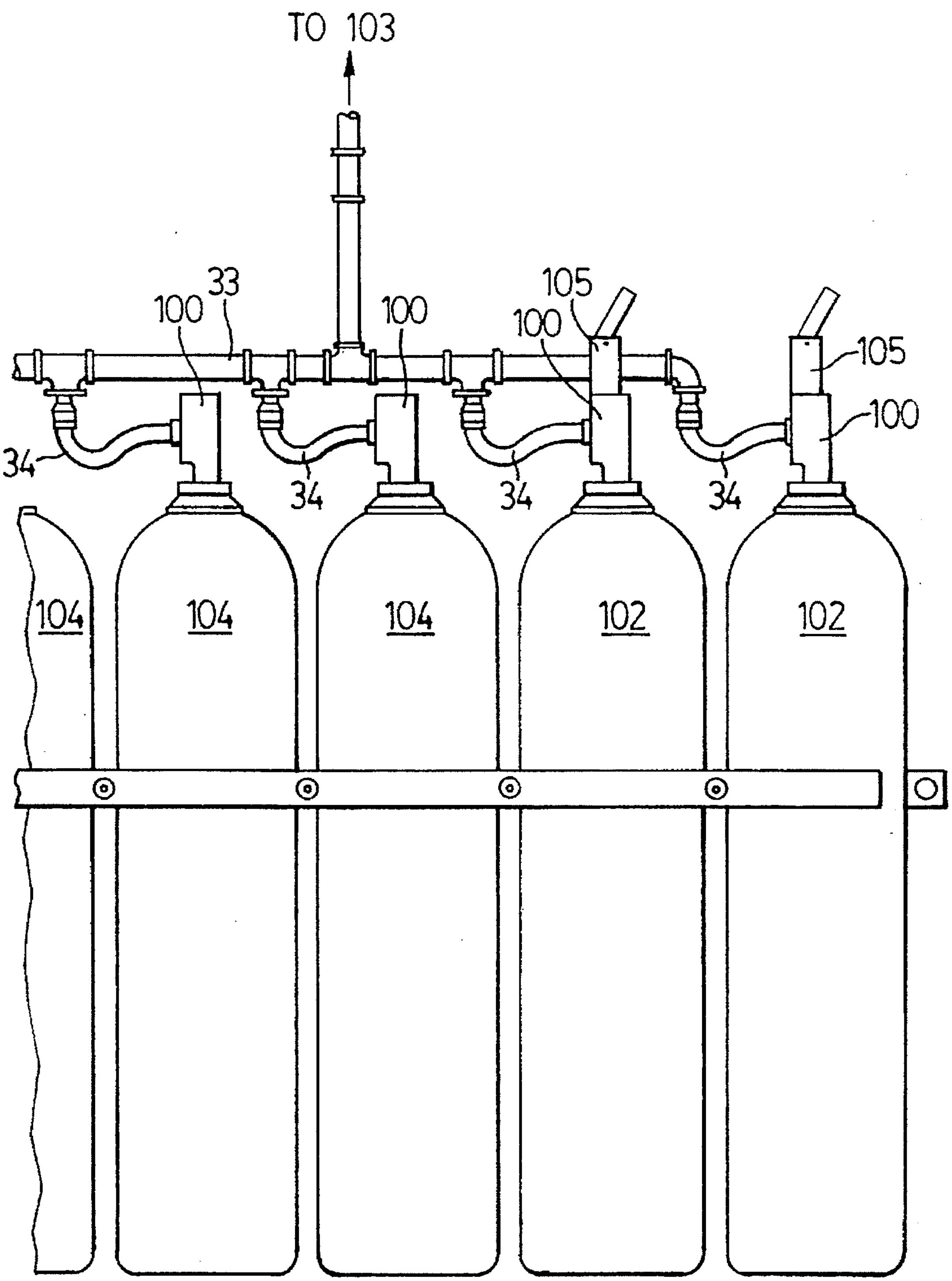
FIG. 8 is a view showing the valve assembly of the present invention in typical system use.

By way of the present invention, pressurized fluid containment systems, such as $CO_2$ fire suppression systems as shown in FIG. 8, can be provided without the need for independent slave actuator lines. In this system, the valve assembly 100 of the invention is capable of being used as either master or slave valves. The two cylinders 102 of compressed $CO_2$ utilize the master valve function of the valve assembly 100 and are provided with external actuators 105, such as identified above, and upon actuation pressurize discharge manifold system 33/34. The tanks 104 of $CO_2$ utilizing the slave function of the valve assembly 100 are connected solely by manifold system 33/34 to the system and are triggered by backpressure therein. The discharge manifold system 33/34 is connected by pipes to the delivery portion 103 of the fire extinguisher system.

The size of the master/slave valve assembly of the present invention is substantially smaller than corresponding prior art valve assemblies of both the master and slave type, as is the cost of production. While the valve assembly of the present invention can of course range in size, a reduction in size and material savings on the order 50% over some prior art valve assemblies is readily achievable. The savings in size and material can be even greater when the valve assembly is compared to valve assemblies having both master and slave capabilities combined. The reduction in cost of manufacturing master-slave valve assemblies provided by the present invention over the prior art is exemplified by the relative number and nature of the steps required in the respective manufacturing processes.

It will now be obvious to one skilled in the art that various changes may be made in the invention without departing from it's true spirit and scope. Accordingly, this invention is not intended to be unduly limited by that which is illustrated in the Drawings and described in the specification.

The embodiments of the invention in which an exclusive property or privilege is claimed are defined as follows:

1. A discharge valve assembly for a pressurized fluid containment system, said discharge valve assembly comprising:

an elongate valve body having a first longitudinally extending bore defining a primary valve chamber adapted to be connected to a fluid pressure source, the bore being eccentrically disposed thereby providing a thickened wall portion to one side of said valve chamber;

a discharge port traversing said thickened wall portion and communicating with said primary valve chamber;

a second longitudinally extending bore defining a secondary valve chamber generally parallel to the primary chamber and communicating at one end with the primary valve chamber and at the other end with the discharge port;

a primary valve member displaceable within the primary valve chamber from a closed position to an open position by fluid pressure acting on a first end of the valve member, and having a pressure equalization opening admitting a holding portion of the pressurized fluid to a second end of the valve member for normally holding the valve in the closed position;

a slave valve member disposed within said secondary valve chamber, one end of said slave valve member being in communication with the holding portion and the other end venting to atmosphere; and an actuating piston displaceable within said secondary valve chamber, a first end of said piston being in communication with said discharge port and a second end being in communication with the atmosphere, wherein a predetermined pressure in said discharge port displaces said actuating piston to displace said slave valve member to an open position and allow the holding portion of the pressurized fluid on the second end of said primary valve member to vent to atmosphere thereby permitting the pressurized fluid acting on the first end to displace said first valve member to the open position and permit the pressurized fluid to flow through said discharge port.

2. A valve assembly as claimed in claim 1 wherein said actuating piston of the slave valve assembly is provided with a circumferential groove in which an O-ring having an easy sliding fit within said secondary valve chamber is disposed, and wherein said groove has radially directed openings which communicate with the discharge end of said actuating piston for expanding the O-ring under pressure to create an effective seal.

3. A discharge valve assembly as claimed in claim 1, including a pilot valve at one end of the primary chamber, the pilot valve being biased to a closed position for confining the holding portion of the pressurized fluid and being displaceable to an open position for releasing said holding portion to atmosphere.

4. A valve assembly as claimed in claim 1, wherein for use in a slave valve mode, the primary valve member is provided with a return spring to urge the valve member into the closed position after both filing and discharge.

5. A valve assembly as claimed in claim 1 wherein said primary valve member, is provided with a replaceable valve seat.

6. A valve assembly as claimed in claim 1, wherein the valve body is machined from an elongate metal blank.

7. A valve assembly as claimed in claim 6 wherein the cross-sectional shape of the metal blank is selected from the group consisting of square, hexagonal, and octagonal shapes.

8. A valve assembly as claimed in claim 6 wherein the valve body is of brass.

* * * * *